United States Patent [19]
Kado et al.

[11] Patent Number: 5,357,787
[45] Date of Patent: Oct. 25, 1994

[54] CANTILEVER FOR ATOMIC FORCE MICROSCOPE AND METHOD OF MANUFACTURING THE SAME

[75] Inventors: Hiroyuki Kado, Osaka; Takao Tohda, Ikoma, both of Japan

[73] Assignee: Matsushita Electric Industrial Co., Ltd., Osaka, Japan

[21] Appl. No.: 201,087

[22] Filed: Feb. 24, 1994

Related U.S. Application Data

[63] Continuation of Ser. No. 909,671, Jul. 7, 1992, abandoned.

[30] Foreign Application Priority Data

Jul. 15, 1991 [JP] Japan ................................. 3-173709
Dec. 26, 1991 [JP] Japan ................................. 3-344517
Mar. 13, 1992 [JP] Japan ................................. 4-54665

[51] Int. Cl.$^5$ ............................................. G01B 5/28
[52] U.S. Cl. ................................................. 73/105
[58] Field of Search ................... 73/105; 250/306, 307

[56] References Cited

U.S. PATENT DOCUMENTS

| | | | |
|---|---|---|---|
| 2,538,622 | 1/1951 | Johnson | 73/105 |
| 2,608,092 | 8/1952 | Williamson | 73/105 |
| 4,106,333 | 8/1978 | Salje et al. | 73/105 |
| 4,290,303 | 9/1981 | Harman et al. | 73/105 |
| 4,791,807 | 12/1988 | Oeschsle | 73/78 |
| 4,960,654 | 10/1990 | Yoshinaka et al. | 428/614 |
| 5,171,992 | 12/1992 | Clabes et al. | 250/306 |
| 5,186,041 | 2/1993 | Nyyssonen | 73/105 |
| 5,218,656 | 6/1993 | Day et al. | 385/47 |

FOREIGN PATENT DOCUMENTS

| | | |
|---|---|---|
| 413040 | 2/1991 | European Pat. Off. |
| 437275 | 7/1991 | European Pat. Off. |
| 0161503 | 8/1985 | Japan ................................. 73/105 |
| 3-218998 | 9/1991 | Japan |

OTHER PUBLICATIONS

T. R. Albrecht et al. "Microfabrication of Cantilever Styli for the Atomic Force Microscope", Jul. 1, 1990, pp. 3386-3396, Journal of Vacuum Science & Technology.

Y. Akama et al. "New Scanning Tunneling Microscopy Tip for Measuring Surface Topography", Jan. 1, 1990, pp. 429-433, Journal of Vacuum Science & Technology.

Abstract: Matsushita Elec Ind KK, "Catalyst for high temp. oxidin. reactions" Apr. 26, 1991, Derwent Publications Ltd., London.

Abstract: Matsushita Elec Ind KK, Zinc oxide whiskers having tetra-pod . . . Aug. 2, 1989, Derwent Publications Ltd., London.

Shin-ichiro Ikebe et al., "Use of a ReO3 Single Crystal as the Tip for Scanning Tunneling Microscopy", pp. L405-L406, Mar. 1991, Japanese Journal of Applied Physics.

"Microfabrication of Cantilever Styli for the Atomic Force Microscope", by Albrecht et al., J. Vac. Sci. Technol. A 8(4), Jul/Aug. 1990.

*Primary Examiner*—Robert Raevis
*Attorney, Agent, or Firm*—Wenderoth, Lind & Ponack

[57] ABSTRACT

A cantilever for an atomic force microscope, has a probe formed by a structure at least partially including a linear needle crystal. A method of manufacturing the cantilever comprises the steps of applying adhesive to a distal end portion of a cantilever body and placing on the adhesive, in a state where the cantilever body is held substantially horizontally, a structure having the shape of at least four needle crystals combined with one another so as to bond the structure to the distal end portion of the cantilever body.

15 Claims, 5 Drawing Sheets

CANTILEVER FOR ATOMIC FORCE MICROSCOPE AND METHOD OF MANUFACTURING THE SAME

This application is a continuation of Ser. No. 909,671, filed Jul. 7, 1992 now abandoned.

BACKGROUND OF THE INVENTION

The present invention generally relates to a cantilever for an atomic force microscope (AFM) and its manufacturing method, and more particularly relates to a cantilever for the AFM which is provided with a probe having a small radius of curvature at its distal end and a large aspect ratio and its manufacturing method.

In recent years, the AFM has been developed as an apparatus capable of observing the surface of a solid surface on the order of the size of atoms. As shown in FIG. 1, a probe 17 is provided on a cantilever body 18 having a length of 100–200 $\mu$m in the known AFM. As described in "Journal of Vacuum Science and Technology", A8, pages 3386–3396, (1990), it has been a general practice that an edge portion at a distal end of the cantilever body is employed as the probe. The probe is manufactured by using an etching pit of crystals as a mold or the probe is manufactured by anisotropic etching. Resolution of the AFM depends upon the radius of curvature at the distal end of the probe, and rises further as the radius of curvature becomes smaller. A probe having a radius of curvature of 20 to 30 nm is manufactured at present and an image of atoms such as mica can be observed by using a cantilever provided with such a probe.

However, the AFM is used not only for observing the surface of a sample on the order of the size of atoms but for observing on the order of nanometers or micrometers a sample having large uneven portions. In the case of the latter observation of a sample, especially, with a sample having deep pits such as grating the probe 17 cannot reach bottom of the pits, and thus it is difficult to accurately measure the shape of the pits. Thus, in this case there is a keen demand for a cantilever provided with a probe which not only has a small radius of curvature at its distal end but has an elongated shape enabling the probe to reach bottom of the pits.

SUMMARY OF THE INVENTION

Accordingly, an essential object of the present invention is to provide, with a view toward solving the problems associated with conventional cantilevers for AFMs, a cantilever for an AFM which is provided with a probe having an extremely small radius of curvature at its distal end and a large aspect ratio so as to enable highly accurate observation of even a sample having deep pits, and its manufacturing method.

In order to accomplish this object of the present invention, a cantilever for an AFM according to the present invention comprises a probe which is formed by a structure including a linear needle crystal at least partially.

It is desirable that the structure has a shape of a tetrapod in which four needle crystals mainly consisting of zinc oxide or zinc selenide extend from a centroid of a regular tetrahedron towards four vertexes of the regular tetrahedron, respectively.

Meanwhile, a method of manufacturing a cantilever for an AFM, according to the present invention, comprises the steps of applying adhesive to a distal end portion of a cantilever body and placing on the adhesive, in a state where the cantilever body is held substantially horizontally, a structure having the shape of at least four needle crystals combined with one another so as to bond the structure to the distal end portion of the cantilever body.

In the cantilever of the present invention, the probe provided on the cantilever body is of a shape having an extremely small radius of curvature at its distal end and a large aspect ratio. A sample having a deep pit has been impossible to measure highly accurately by known cantilevers due to contact of a side face, etc. of a probe with an upper edge of the pit. However, since the probe of the present invention can reach the bottom of the deep pit, the sample can be measured by the AFM having the cantilever of the present invention.

Especially if a three-dimensional structure having the shape of a tetrapod of the needle crystals, which mainly consist of zinc oxide or zinc selenide, is employed, one needle crystal acting as the probe can be relatively easily attached to the cantilever body perpendicularly to the cantilever body. Meanwhile, since distal ends of the remaining three needle crystals of the probe are attached to the cantilever body, the mechanical strength of the probe is increased, and thus the cantilever can be operated stably.

Furthermore, in accordance with the manufacturing method of the present invention, the three-dimensional structure can be relatively easily attached to the cantilever body without incurring damage to the distal ends of the needle crystals.

BRIEF DESCRIPTION OF THE DRAWINGS

Further objects and features of the present invention will become apparent from the following description, taken in conjunction with preferred embodiments thereof and with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
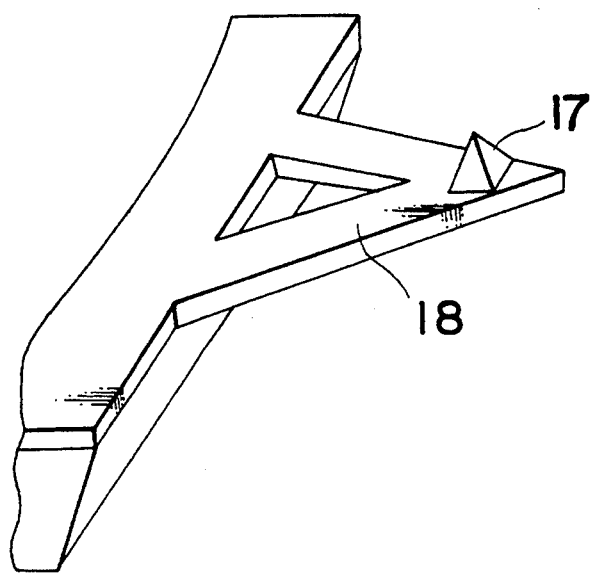
FIG. 1 is a schematic view of a prior art cantilever for an AFM (already referred to)
Figure 2:
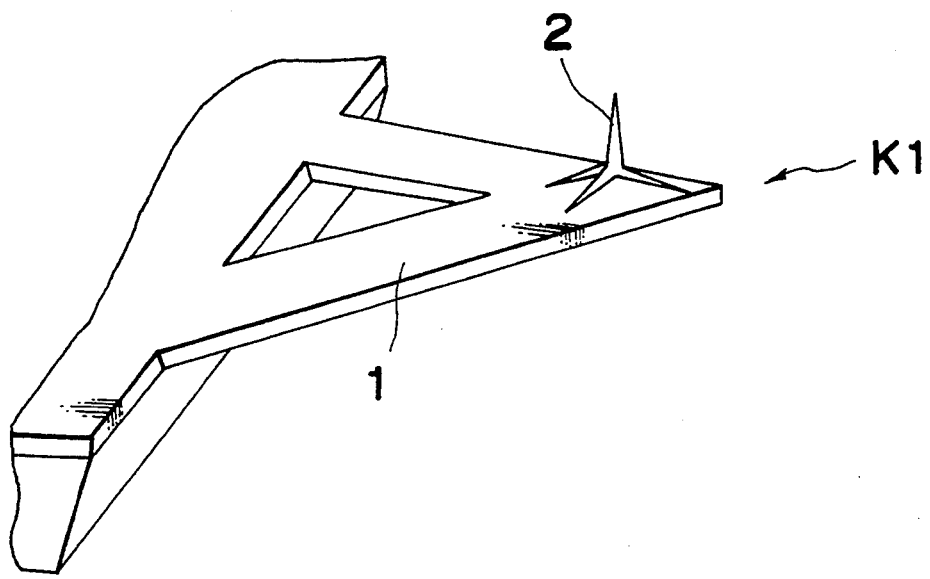
FIG. 2 is a schematic view of a cantilever for an AFM according to a first embodiment of the present invention.

Referring now to the drawings, there is shown in FIG. 2, a cantilever K1 for an AFM according to a first embodiment of the present invention. In the cantilever K1, the structure 2 having a shape of a tetrapod is provided at a distal end portion of a cantilever body 1 and is formed by needle crystals of zinc oxide. One of the needle crystals, which extends perpendicularly to the cantilever body 1, is used as a probe.

Figure 3A:
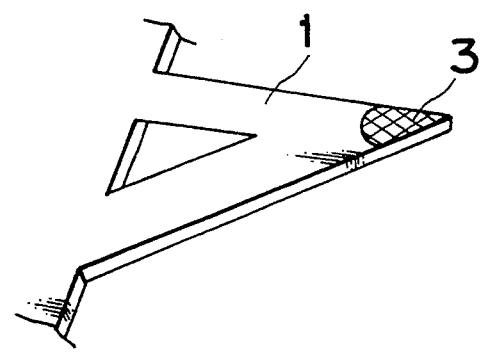
FIGS. 3a and 3b are views explanatory of a method of manufacturing the cantilever of FIG. 2.
Figure 3B:
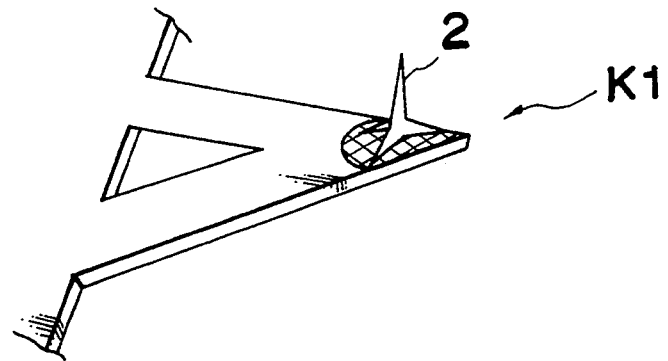

FIGS. 3a and 3b show a method of manufacturing the cantilever K1. The cantilever body 1 is formed by a V-shaped thin film made of $SiO_2$ by photolithography and having a length of 100 μm and a thickness of 1.5 μm. As shown in FIG. 3a, adhesive 3 of epoxy resin is applied to the distal end portion of the cantilever body 1 by using a metal needle. Then, as shown in FIG. 3b, in a state where the cantilever body 1 is held substantially horizontally, the structure 2, having the shape of the tetrapod, of the needle crystals, each having a length of 5 to 30 μm is placed on the adhesive 3 so as to be bonded to the distal end portion of the cantilever body 1.

The structure 2 is produced by vapor phase growth. The structure 2 has a three-dimensional construction having the shape of the tetrapod, in which the needle crystals extend from a centroid of a regular tetrahedron towards four vertexes of the regular tetrahedron, respectively. Therefore, if the structure 2 is merely placed on the cantilever body 1 so as to be attached to the cantilever body 1, one of the needle crystals can be automatically set perpendicularly to the cantilever body 1, and thus can be used as a probe.

Figure 4:
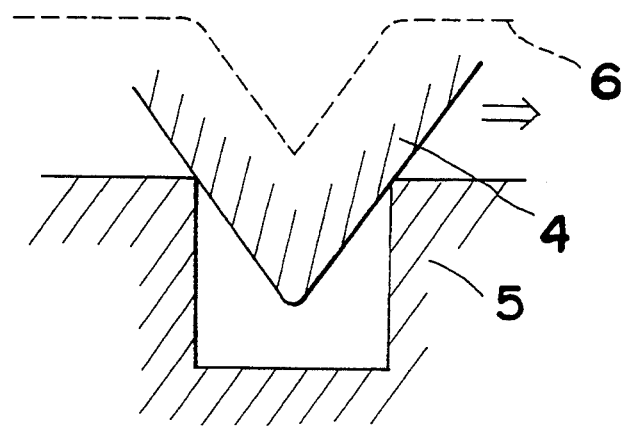
FIG. 4 is a view explanatory of an AFM image obtained by a known cantilever.
Figure 5:
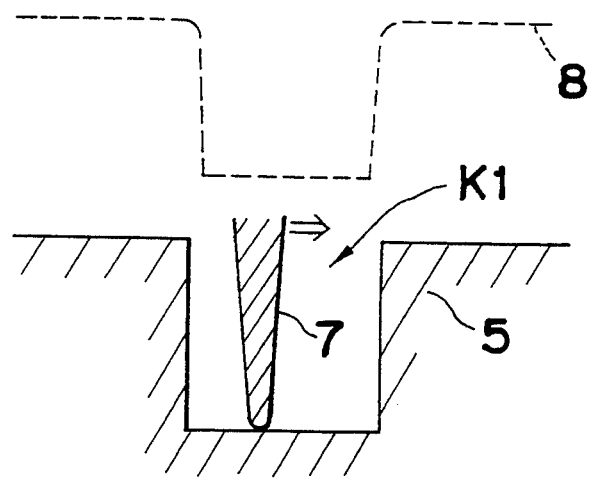
FIG. 5 is a view explanatory of an AFM image obtained by the cantilever of FIG. 2.

By using the AFM incorporating the cantilever K1, a sample having a pit of 1 μm in depth and 1 μm in width is observed. Results of this observation are compared with those of an AFM incorporating a known cantilever in which a probe is made of $Si_3N_4$ by using an etching pit of silicon as a mold. In the case of the known cantilever, since the shape of the probe is determined by the shape of the etching pit of a crystal face (100) of silicon, the probe has a shape of a pyramid having a vertical angle of 70°. Therefore, as shown in FIG. 4, if the known cantilever having such a probe 4 as described above is scanned on a sample 5 in the direction of the arrow, the probe cannot reach bottom of the pit. As a result, an image 6 different from the actual shape the of surface of the sample 5 is obtained, as shown by the broken line in FIG. 4. On the other hand, in the case of the cantilever of the present invention, in which the needle crystal of zinc oxide acts as the probe, a probe 7 formed by the needle crystal can reach the bottom of the pit, so that an image 8 consistent with the shape of the surface of the sample 5 can be obtained.

Meanwhile, production itself of the structure having the shape of the tetrapod is known from, for example, "Journal of Crystal Growth" 102, pages 965–973, (1990). The manufacturing method of the present invention can be widely applied to such known technology.

Furthermore, in this embodiment, the cantilever body is formed by the thin film of $SiO_2$. However, the cantilever body may also be formed by a thin film of $Si_3N_4$ or a metallic thin film of tungsten, gold, etc.

In addition to the needle crystals mainly consisting of zinc oxide in the three-dimensional structure having the shape of the tetrapod, the same effects can be achieved by the needle crystals mainly consisting of zinc selenide.

Moreover, structures formed by needle crystals having a large mechanical strength, such as SiC, $Al_2O_3$, W, graphite, Fe, Cu, B, Sn, Pb, In, potassium titanate, etc. can be employed as the probe brought into contact with the cantilever body. However, since these structures are of two-dimensional construction, the production yield of the structures is inferior to that of the structure having the shape of the tetrapod.

Figure 6A:
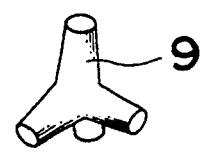
FIGS. 6a to 6c are views showing steps of a method of manufacturing a cantilever for an AFM according to a second embodiment of the present invention.
Figure 6B:
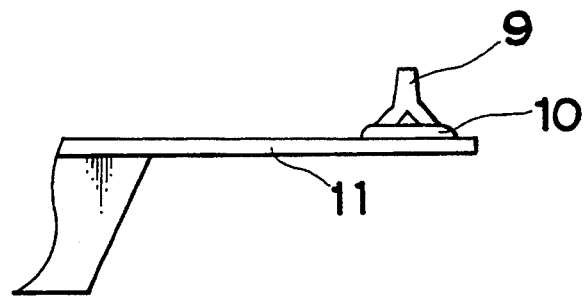
Figure 6C:
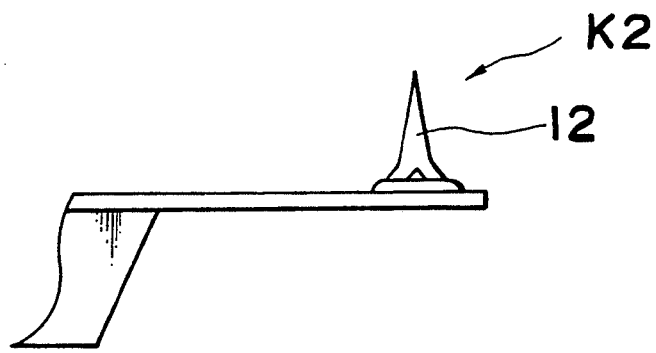

FIGS. 6a to 6c show steps of a method of manufacturing a cantilever K2 for an AFM according to a second embodiment of the present invention. Initially, a surface of minute particles of zinc having a size of 1 to 100 μm is oxidized in water. Subsequently, the minute particles are dried and then, heated to 920° C. in an atmosphere of oxygen. Thus, crystal growth of the minute particles is halfway continued so as to obtain a structure 9 made of zinc oxide and having the shape of a tetrapod as shown in FIG. 6a. Meanwhile, a cantilever body 11 is formed by a V-shaped thin film made of $SiO_2$ by photolithography and having a length of 100 μm and a thickness of 1.5 μm. Subsequently, the structure 9 is attached to a distal end portion of the cantilever body 11 by using silver paste 10 as shown in FIG. 6b. Since the structure 9 of zinc oxide has the shape of the tetrapod, the structure 9 can be stably secured to the cantilever body 11 by three legs of the structure 9, while the remaining one leg can be projected from the cantilever body 11 so as to be oriented substantially perpendicularly to the cantilever 11. Thereafter, the structure 9 is again heated to 920° C. in an atmosphere of oxygen such that crystal growth of the structure 9 is performed completely. As a result, a structure 12 having the shape of a tetrapod, in which crystal growth has been performed completely, is obtained as shown in FIG. 6c. In the structure 12, each of legs has a length of 5 to 20 μm. Meanwhile, observation of the legs of the structure 12 by a transmission electron microscope has revealed that a distal end of each of the legs of the structure 12 has a radius of curvature of not more than 5 nm. One needle crystal grown perpendicularly to the main face of the cantilever body 11 is employed as a probe of the AFM. In this manufacturing method, since the distal end of each of the needle crystals is grown after the needle crystals grown halfway have been bonded to the cantilever body, it becomes possible to prevent the undesirable phenomenon of the distal end of each of the needle crystals becoming damaged when the structure of zinc oxide is attached to the cantilever body.

Figure 7A:
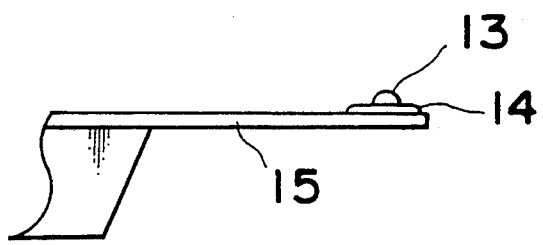
FIGS. 7a and 7b are views showing steps of a method of manufacturing a cantilever for an AFM according to a third embodiment of the present invention.
Figure 7B:
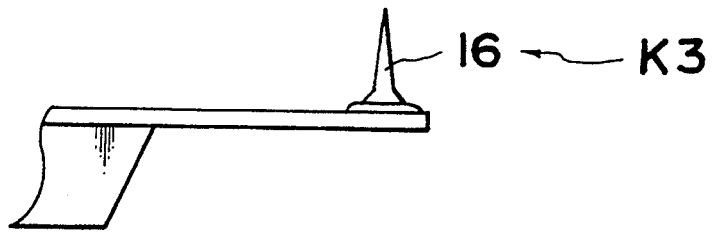

FIGS. 7a and 7b show steps of a method of manufacturing a cantilever K3 for an AFM according to a third embodiment of the present invention. Initially, a surface of minute particles of zinc having a size of 1 to 100 μm is oxidized in water. Meanwhile, a cantilever body 15 is formed by a V-shaped thin film made of $Si_3N_4$ by photolithography and having a length of 100 μm and a thickness of 0.6 μm. After minute particles 13 of zinc oxide have been dried, the minute particles 13 are attached to a distal end portion of the cantilever body 15 by using silver paste 14 as shown in FIG. 7a. Subsequently, the minute particles 13 are heated to 920° C. in an atmosphere of oxygen such that crystal growth of the minute particles 13 is performed. As a result, a structure 16 made of zinc oxide and having the shape of a tetrapod, in which crystal growth has been performed, is obtained. In this manufacturing method, since the needle crystals are grown after the minute particles of zinc oxide have been bonded to the cantilever body, it becomes possible, as in the second embodiment, to prevent the undesirable phenomenon of the distal end 10 of each of the needle crystals becoming damaged when the structure of zinc oxide is attached to the cantilever body.

As is clear from the foregoing description, a cantilever provided with a probe having a large aspect ratio and a small radius of curvature at its distal end can be obtained in the present invention. Accordingly, by using such a cantilever, even a sample having a deep pit such as grating, etc. can be measured highly accurately.

What is claimed is:

1. A cantilever for an atomic force microscope, comprising:
    a cantilever body; and
    a probe on said cantilever body, said probe consisting of a structure made up of four needle crystals combined with one another.

2. The cantilever of claim 1, wherein said probe is bonded to said cantilever body by an adhesive.

3. The cantilever of claim 1, wherein said structure has the shape of a tetrapod in which said four needle crystals extend from a centroid of a regular tetrahedron towards four vertexes of the regular tetrahedron, respectively.

4. The cantilever of claim 3, wherein said needle crystals consisting of zinc oxide.

5. The cantilever of claim 3, wherein said needle crystals consisting of zinc selenide.

6. The cantilever of claim 1, wherein said needle crystals consisting of zinc oxide.

7. The cantilever of claim 1, wherein said needle crystals consisting of zinc selenide.

8. A cantilever for an atomic force microscope, comprising:
    a cantilever body; and
    a probe on said cantilever body, said probe consisting of a structure having the shape of a tetrapod in which four needle crystals extend from a centroid of a regular tetrahedron towards four vertexes of the regular tetrahedron, respectively.

9. The cantilever of claim 8, wherein said needle crystals consisting of zinc oxide.

10. The cantilever of claim 8, wherein said needle crystals consisting of zinc selenide.

11. The cantilever of claim 8, wherein said probe is bonded to said cantilever body by an adhesive.

12. A cantilever for an atomic force microscope, comprising:
    a cantilever body; and
    a probe on said cantilever body, said probe consisting of a linear needle crystal structure, wherein said linear needle crystal structure consisting of zinc oxide.

13. The cantilever of claim 12, wherein said probe is bonded to said cantilever body by an adhesive.

14. A cantilever for an atomic force microscope, consisting of:
    a cantilever body; and
    a probe on said cantilever body, said probe consisting of a linear needle crystal structure, wherein said linear needle crystal structure consisting of zinc selenide.

15. The cantilever of claim 14, wherein said probe is bonded to said cantilever body by an adhesive.

* * * * *